2 Sheets--Sheet 1.

C. WILLIAMS.

Cooking-Stove.

No. 5,126. Reissued Oct. 29, 1872.

Witnesses.

B. W. Williams

Frank A. Doherty

Inventor

Charles Williams by his attys

Henry W. Williams & Co

2 Sheets--Sheet 2.

C. WILLIAMS.

Cooking-Stove.

No. 5,126. Reissued Oct. 29, 1872.

Witnesses.

B. W. Williams

Frank A. Doherty.

Charles Williams INVENTOR.

by his attys. Henry W. Williams & Co.

UNITED STATES PATENT OFFICE.

CHARLES WILLIAMS, OF MANCHESTER, NEW-HAMPSHIRE.

IMPROVEMENT IN COOKING-STOVES.

Specification forming part of Letters Patent No. 64,267, dated April 30, 1867; reissue No. 5,126, dated October 29, 1872.

*To all whom it may concern:*

Be it known that I, CHARLES WILLIAMS, of Manchester, in the county of Hillsborough and State of New Hampshire, have invented an Improved Cooking-Stove; and do hereby declare the same to be fully described in the following specification and represented in the accompanying drawing, of which—

Figure 3:
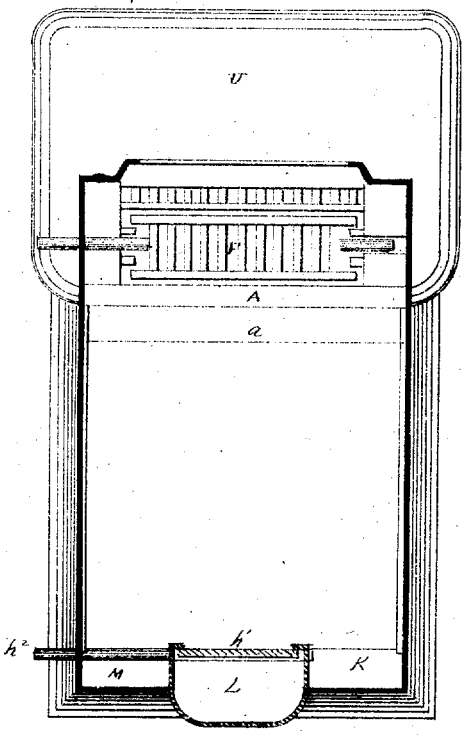
Figure 2:
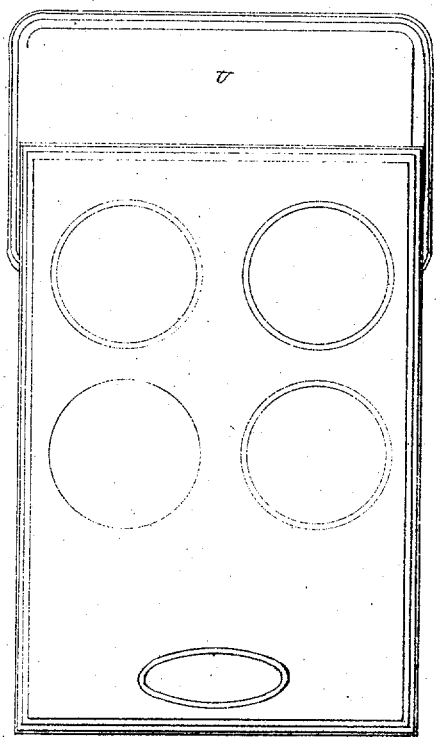
Figure 1:
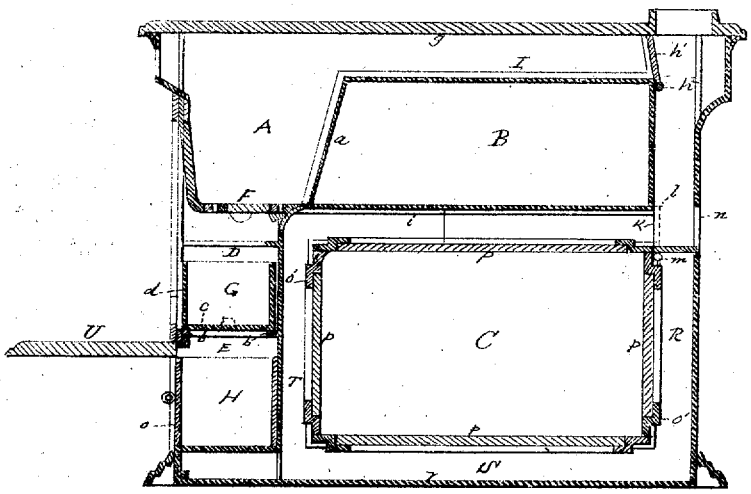
Figure 4:
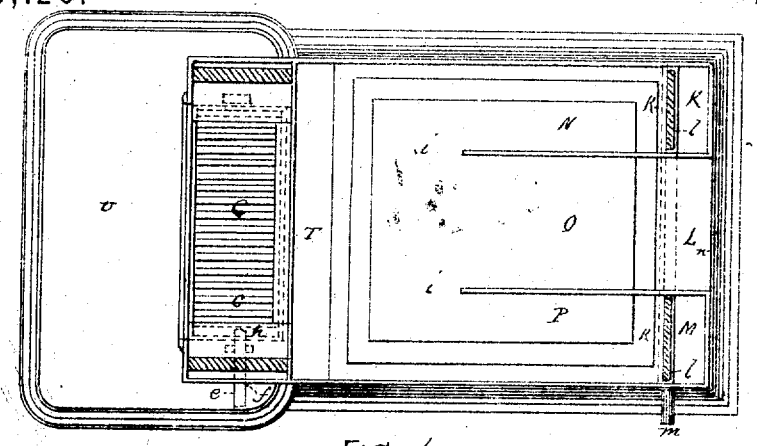
Figure 5:
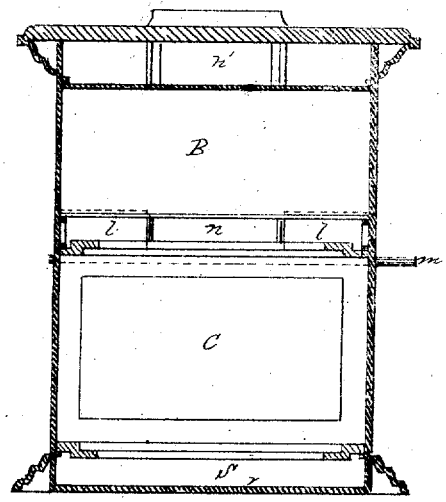
Figure 6:
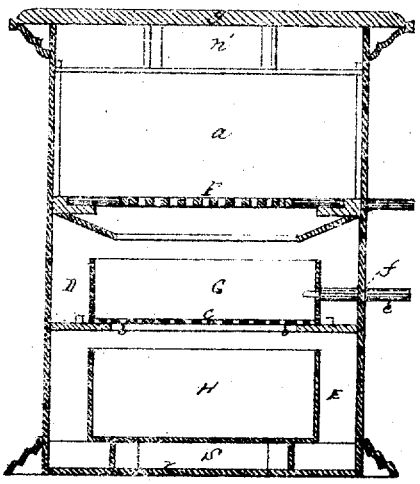

Figure 1 is a vertical and longitudinal section of it; Fig. 2 is a top view; Fig. 3 is a horizontal section taken through the smoke-flue over the upper oven; Fig. 4 is a horizontal section taken through the smoke-flues between the two ovens; Fig. 5 is a transverse section taken through the two ovens; and Fig. 6 is a transverse section taken through the fire-place, the ash-drawer, and screen, and the chamber thereof.

In making the stove I have endeavored to avoid the adoption of the usual ash-chamber or pit arranged underneath and opening through the hearth of the stove; the object of such avoidance being to keep the hearth cool, so as to prevent it from burning or scorching the clothes or the person of a cook when against it; and also to cause the ashes and cinders to fall by their own gravity into the ash-sifter and the ash-drawer. I thus save the employment of a chute or inclined plane for conveying the ashes from the grate to the sifter, and as a consequence render unnecessary any raking forward of such ashes on such plane, as frequently becomes requisite when such plane is used. I have also constructed the main oven in part of steatite slabs or panels, and metallic frames for holding them in place. I have also a new arrangement of flues about the ovens.

Figure 7:
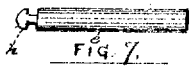

In the drawing, A denotes the fire-place; B the upper, and C the lower, of two ovens, one of which is arranged directly in rear of the fire-place and against the back plate *a* thereof, such back plate serving to form one side of the oven. The lower oven C is arranged against or on a level with the ash-sifter and drawer-chambers D E, one of which is disposed directly over the other, and both are placed wholly underneath the fire-place, whose grate F is supported so as to be capable of being revolved in order to discharge ashes and cinders from it directly into the ash-sifter G. The said ash-sifter is arranged so as to rest on ledges *b b*, which are on or about on a level with the hearth U, which is a shelf projecting from the front of the stove, and between the ash-sifter and its drawer H, or the chambers D E of the two. There is no depression or ash-chamber in the hearth; but the air is free to circulate wholly underneath the hearth so as to keep it cool. The drawer H is to be inserted into the chamber E, and to be withdrawn therefrom through an opening, *o'*, in its front and from underneath the hearth. The ash-sifter, which is a rectangular box, open at top and provided with a grate, *c*, in its bottom, is to be withdrawn from its chamber or introduced into it through an opening, *d*, in the front plate of the stove. A rod, *e*, extending through a hole, *f*, in one side of the stove, and provided with a catch, *h*, as shown in Fig. 7, by having such catch inserted in a rectangular or elongated opening made in one end of the sifter, and being turned ninety degrees thereon, becomes so connected with the sifter as to enable a person by means of such rod to move the sifter longitudinally and quickly back and forth so as to sift from it any ashes, which will fall into the ash-receptacle. After having disengaged the rod *e* from the sifter the latter may be withdrawn from its chamber in order for the discharge into the fire-place of the coals or cinders left in the sifter. A flue, I, extends entirely over the upper oven and underneath the top plate *g* of the stove. Leading downward from the flue I, and in rear of the upper oven, are three descending flues, K L M. The middle one of these flues extends up to and opens through the top plate of the stove, and is provided with a damper, $h^1$, where it opens out of the flue I, such damper being fixed to a rod or shaft, $h^2$, leading through one side of the stove. The said flue L is closed at its bottom, but opens laterally into the middle flue O of the three flues N O P, arranged between the two ovens, and communicating together by openings *i i*, as shown in Fig. 4. The two flues K M open at their lower ends into a vertical flue-space, R, which extends entirely across the back of the lower oven. Furthermore, there are openings *k k* leading from the flues K M into the flues N P, such openings being provided with dampers *l l* attached to a rod, *m*, going through one side of the stove. At the lower part of the flue L there is an opening, *n*, made through the rear end plate of the stove, and on a level with the flue O, such opening, when the stove is in use, being provided with a door or cover. This opening is to facilitate the cleaning of the flue O. Furthermore, there is a flue, S, extending underneath the bottom of the lower oven, and opening out of the flue-space R and into a flue, T, which goes up against the front end of the lower oven, and between it and the ash-sifter and box-chamber D E. The flue T, at its upper end, opens into the flues between the two ovens. The bottom, the top, and each vertical end of the oven I construct of a rectangular frame, *o'*, and a panel, P, of soap-stone or steatite fixed in the opening of such frame. In this way I construct an oven more retentive of heat than it would be if made entirely of iron or metal. The iron bottom plate of the stove, shown at *r*, extends entirely beneath the oven and the fire-place underneath the lower oven. I would observe that the dampers *l l*, when turned in horizontal position or thereabout, interrupt communication between the flues K M and the flue R, and thereby cause the smoke, after its passage down the said flues K M, to flow into the two flues N P. By opening the upper damper $h^1$ the smoke from the flue I will escape through the opening of the top plate of the stove instead of passing into the flues K M.

By the above-mentioned peculiar arrangement of flues and dampers the smoke and volatile products of combustion issuing from the fire-place, when the latter is charged with fuel in a state of ignition, may be caused to circulate about both ovens, or only around the upper one of them, as circumstances may require. So, for instance, if we raise the lower dampers into vertical positions, the smoke will pass from the flues K M into the flue R; from thence into and through the flue S; thence into and up the flue T; thence into the flue-space or spaces between the two ovens; and thence into and up the flue L. By turning down the lower dampers, the smoke will pass directly from the diving-flues K M into the flues N P; thence into the flue O; and thence into and up the flue L, heating in its course the top, back, and bottom of the upper oven, and the top only of the lower one.

I make no claim to an oven made of soap-stone or steatite; nor do I claim an oven made with an iron case and a soap-stone lining contained therein; nor do I claim a stove made with soap-stone sides and a fire-pot arranged within it, and so that the space between the pot and the soap-stone may be used as an oven. I have arranged the flue-space outside of the oven and against soap-stone panels and metallic frames to hold them, and between such and the outer metallic case of the stove. I make no claim to the arrangement of flues, and ovens, and dampers, as represented in Letters Patent No. 3,861, dated December 19, 1844; and in Letters Patent No. 77, additional thereto, and dated July 5, 1845. I combine with such an arrangement of ovens and flues as is shown in such additional patent, a flue-opening and damper, $h^1$, thereto, whereby the heat and smoke, instead of being made to circulate through the diving-flues and about either or both the ovens, may be led directly from the flue I, over the upper oven, into the chimney or escape-flue, thereby saving at times unnecessary heating of either or both the ovens.

What I claim as my invention in such stove is as follows:

1. I claim the combination and arrangement of the ash-sifter G or its equivalent, and box H, their chambers D E, and the fire-place A, in the relative positions above specified, and substantially as hereinbefore set forth.

2. I also claim the combination and arrangement of the fire-place A and chambers D E, all inclosed in the body of the stove in the relative positions above set forth, and constructed substantially as described.

3. I also claim the combination and arrangement of the two ovens B C, the ash-sifter G, and box-chambers D E, and the fire-place A, substantially as specified.

4. I also claim the arrangement of the flues I, K, L, M, N, O, P, R, S, and T, and dampers $h^1$ *l l*, substantially as hereinbefore set forth.

CHARLES WILLIAMS

Witnesses:
HENRY W. WILLIAMS,
E. H. OBER.